United States Patent [19]

Yoshizawa et al.

[11] Patent Number: 5,074,900
[45] Date of Patent: Dec. 24, 1991

[54] METHOD OF HEATING GLASS SHEET FOR LAMINATED GLASS

[75] Inventors: Hideo Yoshizawa; Yasuyuki Nagai, both of Osaka, Japan

[73] Assignee: Nippon Sheet Glass Co., Ltd., Japan

[21] Appl. No.: 525,537

[22] Filed: May 18, 1990

[30] Foreign Application Priority Data

May 19, 1989 [JP] Japan .................................. 1-126122

[51] Int. Cl.⁵ .......................................... C03B 23/02
[52] U.S. Cl. ...................................... 65/106; 65/111; 65/163
[58] Field of Search .................... 65/29, 106, 111, 163, 65/273

[56] References Cited

U.S. PATENT DOCUMENTS 4,311,503 1/1982 Kellar et al. ............................ 65/29
4,952,227 8/1990 Herrington et al. .................. 65/163

Primary Examiner—Joye L. Woodard
Attorney, Agent, or Firm—Merchant, Gould, Smith, Edell, Welter & Schmidt

[57] ABSTRACT

First and second glass sheets, which are to be combined together into a single laminated glass sheet, are heated in a heating furnace so that the temperature of the first glass sheet at the exit of the heating furnace and the temperature of the second glass sheet at the exit of the heating furnace are substantially equal to each other.

3 Claims, 4 Drawing Sheets

1

METHOD OF HEATING GLASS SHEET FOR LAMINATED GLASS

BACKGROUND OF THE INVENTION

1. Field of the Invention

The present invention relates to a sheet glass heating method, and more particularly to a method of heating a glass sheet for laminated glass.

2. Description of the Relevant Art

Laminated glass, which finds wide use as front windshields of automobiles, is manufactured by heating first and second glass sheets to be paired in a heating furnace, shaping and annealing the glass sheets, and then joining the glass sheets face to face. The glass sheets may be shaped by a press shaping process, a gravity shaping process, or a roller shaping process. The first and second glass sheets are joined face to face by adhesive bonding with an intermediate film as of polyvinyl butyral sandwiched therebetween.

When the first and second glass sheets are to be bonded to each other, it is necessary that they be of a bent configuration having substantially the same shape. Basically, the first and second glass sheets are heated under the same conditions in the heating furnace so that they are held at the same temperature To at the exit of the heating furnace. The first and second glass sheets are fed, alternately one by one, two by two, or three by three, into the heating furnace.

The first and second glass sheets, from which laminated glass is to be constructed, may not necessarily have the same characteristics, such as thicknesses, material properties, and colored conditions, at all times. For example, the first and second glass sheets may have different thicknesses, or the first glass sheet may be a colored transparent glass sheet whereas the second glass sheet may be a colorless transparent glass sheet. If the first and second glass sheets have such different characteristics, then they tend to be held at different temperatures To at the exit of the heating furnace. As a result, the first and second glass sheets may not be shaped desirably, and may not appropriately be bonded to each other after they are shaped and annealed.

The present invention has been made in an effort to effectively solve the aforesaid problems of the conventional method of heating glass sheets for laminated glass.

SUMMARY OF THE INVENTION

It is an object of the present invention to provide a method of heating first and second glass sheets for laminated glass so that even if the first and second glass sheets have different characteristics, they can be held at the same temperature To at the exit of a heating furnace, can be shaped to a desired configuration, and can as well be bonded face to face to each other after they are shaped and annealed.

To achieve the above object, there is provided in accordance with the present invention a method of heating a first glass sheet and a second glass sheet which are to be combined into a single laminated glass sheet, in at least a heating furnace before the first and second glass sheets are shaped, the first glass sheet being heatable more easily than the second glass sheet, the method comprising the step of heating the first and second glass sheets so that the temperature of the first glass sheet at the exit of the heating furnace and the temperature of the second glass sheet at the exit of the heating furnace are substantially equal to each other.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 13:
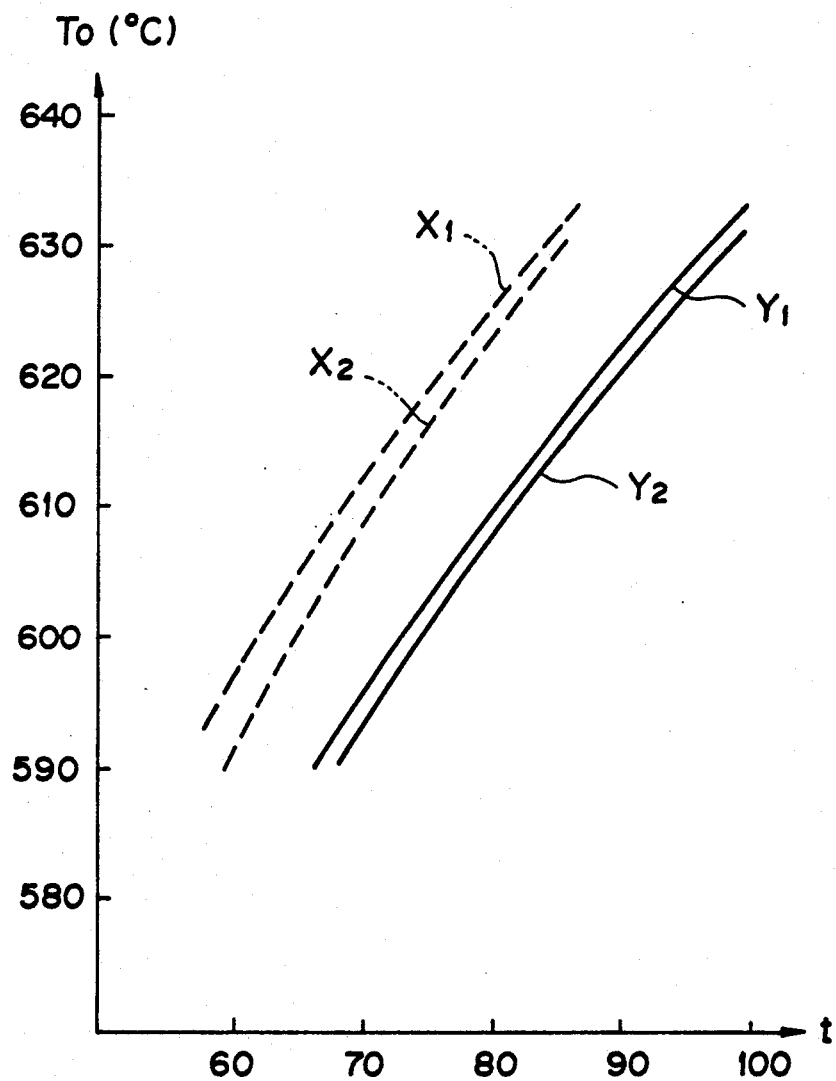
FIG. 13 is a graph showing the relationship between heating times and temperatures at the exit of a heating furnace when various glass sheets are heated in the heating furnace which is kept at a constant temperature therein.

FIG. 13 shows the relationship between heating times and glass temperatures at the exit of a heating furnace when four kinds of sheet glass are heated in the heating furnace which is kept at a constant temperature Ti therein. All the four glass sheets are sized 450 mm×450 mm. The horizontal axis of the graph of FIG. 13 represents a heating time t and the vertical axis represents the glass temperature To at the exit of the heating furnace.

The characteristics of the heated glass sheets are indicated by respective curves X1, X2, Y1, Y2.

In the experiment to obtain the data shown in FIG. 13, the heating furnace had ceramic rollers for feeding glass sheets and electric heaters inside of the furnace wall. The surface temperature of each of the heaters was controlled so as to be at a desired level by a thermocouple. Specifically, the surface temperature of the heaters above the rollers was kept at 660° C., and the surface temperature of the heaters below the rollers was kept at 650° C.

|     | Thickness | Color |
| --- | --- | --- |
| X1: | 2.0 mm | Blue (= colored transparent glass) |
| X2: | 2.3 mm | Blue (= colored transparent glass) |
| Y1: | 2.0 mm | Colorless (= colorless transparent glass) |
| Y2: | 2.3 mm | Colorless (= colorless transparent glass) |

It can be understood from FIG. 13 that when the glass sheets are heated under the same conditions, the temperatures To of the colored glass sheets at the exit of the heating furnace are generally higher than the temperatures To of the colorless glass sheets at the exit of the heating furnace. Comparison between the colored glass sheets or the colorless glass sheets indicates that the glass temperature To at the heating furnace exit is higher if the glass sheet thickness is smaller.

If the shape, material property, or color of a first glass sheet for laminated glass is different from the shape, material property, or color of a second glass sheet, therefore, when the first and second glass sheets are heated under the same conditions, their temperatures To at the exit of the heating furnace are different from each other.

Figure 1:
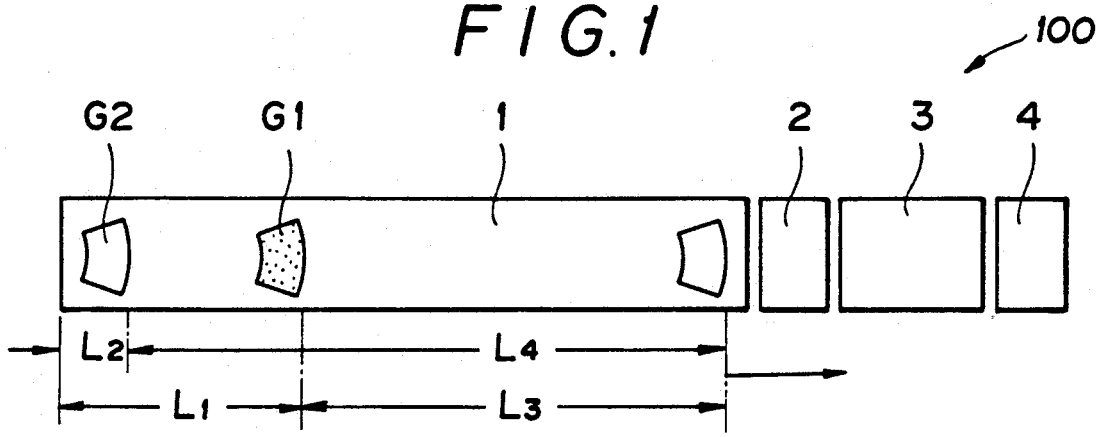
FIG. 1 is a schematic plan view of a sheet glass bending apparatus which carries out a method of heating glass sheets for laminated glass according to a first embodiment of the present invention.

FIG. 1 schematically shows a sheet glass bending apparatus, generally designated by the reference numeral 100, which carries out a method of heating glass sheets for laminated glass according to a first embodiment of the present invention. It is assumed that a single laminated glass sheet is constructed of first and second glass sheets G1, G2 and the first glass sheet G1 can be heated more easily than the second glass sheet G2.

Figure 2:
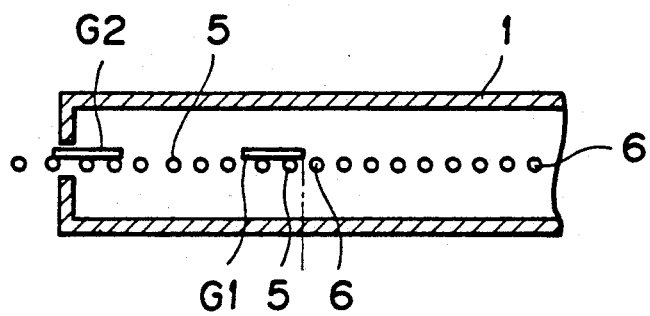
FIG. 2 is a fragmentary longitudinal cross-sectional view of a heating furnace of the sheet glass bending apparatus shown in FIG. 1.

The sheet glass bending apparatus 100 comprises a heating furnace 1 which is heated to a constant temperature Ti therein, a press machine 2 disposed downstream of the heating furnace 1, a lehr 3 disposed downstream of the press machine 2, and a pickup device 4 disposed downstream of the lehr 3. A succession of first rollers 5 (FIG. 2), serving as a feed conveyor, is disposed in an upstream region in the heating furnace 1, for feeding the first and second glass sheets G1, G2 into the heating furnace 1. The first rollers 5 are arrayed over a distance L1 along the direction in which glass sheets are fed through the heating furnace 1. Another succession of second rollers 6, also serving as a conveyor, is disposed in the heating furnace 1, following the first rollers 5. The second rollers 6 are arrayed over a distance L3 along the glass sheet feeding direction. As seen in FIGS. 1 and 2, the first and second rollers 5, 6 continuously feed the first and second glass sheets G1, G2 within the furnace 1, while keeping the glass sheets G1, G2 horizontal. The first rollers 5 are rotatable selectively at different speeds such that they can feed glass sheets at a higher speed Vh and a relatively low constant speed Vl. The second rollers 6 are however rotatable at a fixed speed such that they can feed glass sheets at the relatively low constant speed Vl.

Initially, a single first glass sheet G1 is fed into the heating furnace 1 by the first rollers 5 and displaced over the distance L1 at the higher speed Vh. Then, the glass sheet G1 is delivered over the distance L3 at the lower speed Vl by the second rollers 6.

When the glass sheet G1 has traversed the distance L1, a second glass sheet G2 is introduced into the heating furnace 1 by the first rollers 5. At this time, the introduced second glass sheet G2 is fed over a distance L2, shorter than the distance L1, at the higher speed Vh. Then, the speed at which the second glass sheet G2 is fed is shifted from the higher speed Vh to the lower speed Vl by a control mechanism (not shown). The second sheet glass G2 is subsequently fed over a distance L4 at the lower speed Vl, the distance L4 satisfying the relationship: L1+L3=L2+L4.

From the exit or terminal end of the heating furnace 1, the glass sheets G1, G2 are successively sent to the press machine 2 where they are pressed to shape.

When the first and second glass sheets G1, G2 are heated in the above fashion, the temperature To1 of the first glass sheet G1 at the exit of the heating furnace and the temperature To2 of the second glass sheet G2 at the heating furnace exit are equalized to each other. The ratio between the distances L1, L3, the ratio between the distances L2, L4, and the specific values of the speeds Vh, Vl are determined depending on the preset temperature Tin in the heating furnace 1 and desired temperatures To1, To2 of the glass sheets G1, G2 at the exit of the heating furnace 1.

Figure 3A:
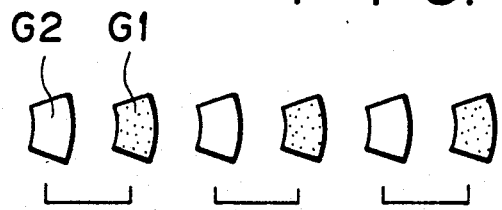
FIGS. 3A through 3C are views showing various sequences by which first and second glass sheets are heated.

Preferably, first and second glass sheets G1, G2 are introduced into the heating furnace 1 such that glass sheets G1, G2 to be paired into a laminated glass sheet are disposed closely to each other. When the glass sheets G1, G2 are heated in the manner described above, they are alternately introduced into the heating furnace 1 as shown in FIG. 3A, and successive first and second glass sheets G1, G2 are combined into laminated glass sheets.

Figure 3B:

As shown in FIG. 3B, sets of two first glass sheets G1 and sets of two second glass sheets G2 may alternately be introduced into the heating furnace 1, and successive two glasses G1, G2 or successive two glasses G2, G1 may be combined into laminated glass sheets.

Figure 3C:
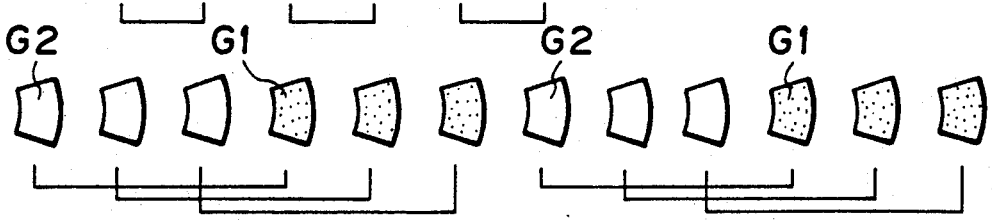

Alternatively, as shown in FIG. 3C, sets of three first glass sheets G1 and sets of three second glass sheets G2 may alternately be introduced into the heating furnace 1, and each of the first glass sheets G1 in one set may be combined with the third following second glass sheet G2 in the next set, thereby making up a laminated glass sheet.

In the sheet glass bending apparatus 100, the first and second glass sheets G1, G2 are fed over the same distance (=L1+L3=L2+L4) in the heating furnace 1, but the average speed at which the first glass sheet G1 that can be heated relatively easily is fed in the heating furnace 1 is higher than the average speed at which the second glass sheet G2 is fed in the heating furnace 1.

Figure 4:
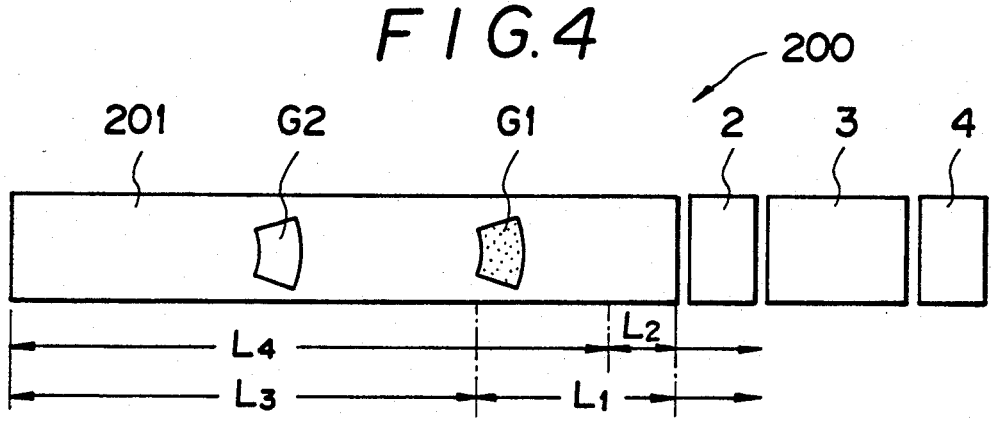
FIG. 4 is a schematic plan view of a sheet glass bending apparatus which carries out a method of heating glass sheets for laminated glass according to a second embodiment of the present invention.

FIG. 4 schematically shows a sheet glass bending apparatus, generally designated by the reference numeral 200, which carries out a method of heating glass sheets for laminated glass according to a second embodiment of the present invention. Those components shown in FIG. 4 which are identical to those shown in FIG. 1 are denoted by the identical reference numerals, and will not be described in detail.

The sheet glass bending apparatus 200 comprises a heating furnace 201 which is heated to a constant temperature Ti therein, a press machine 2, a lehr 3, and a pickup device 4 which are successively disposed downstream of the heating furnace 201.

Although not shown, the second rollers 6 are disposed in an upstream region in the heating furnace 1 and arrayed over the distance L3, and the first rollers 5 are disposed downstream of the second rollers 6 and arrayed over the distance L1 in the heating furnace 1.

In operation, a single first glass sheet G1 is introduced into the heating furnace 201 by the second rollers 6 and fed over the distance L3 at the lower speed Vl. Then, the glass sheet G1 is fed over the distance L1 at the higher speed Vh by the first rollers 5 until the glass sheet G1 reaches the exit at the terminal end of the heating furnace 201.

While the glass sheet G1 is being fed over the distance L3, a second glass sheet G2 is introduced into the heating furnace 201 by the second rollers 6. The glass sheet G1 is fed over the distance L4 at the lower speed Vl first by the second rollers 6 and then by the first rollers 5. The second glass sheet G2 is further fed over the distance L2 by the first rollers 5 before it arrives at the exit at the terminal end of the heating furnace 201.

The glass sheets G1, G2 are successively fed from the terminal end of the heating furnace 201 to the next press machine 2, by which the glass sheets G1, G2 are pressed to shape.

In the heating method described above with reference to FIG. 4, the temperature To1 of the first glass sheet G1 at the exit of the heating furnace and the temperature To2 of the second glass sheet G2 at the heating furnace exit are equalized to each other. More specifically, in the sheet glass bending apparatus 200, the first and second glass sheets G1, G2 are fed over the same distance (=L3+L1=L4+L2) in the heating furnace 201, but the average speed at which the first glass sheet G1 that can be heated relatively easily is fed in the heating furnace 201 is higher than the average speed at which the second glass sheet G2 is fed in the heating furnace 201.

In the heating furnaces 1, 201 shown in FIGS. 1 and 4, respectively, the first rollers 5 which are rotatable selectively at different speeds are disposed in one of the upstream and downstream regions in the heating furnace. However, the first rollers 5 may be disposed so as to exist over the entire length of the heating furnace, and may be controlled so as to rotate selectively at different speeds.

The heating methods to be carried out by the sheet glass bending apparatus 100, 200 have to meet only the one requirement that the average speed at which the first glass sheet G1 is fed in the heating furnace be higher than the average speed at which the second glass sheet G2 is fed in the heating furnace. Therefore, with the lower speed Vl and the higher speed Vh being set to suitable values, only the first glass sheet G1 may be fed at the higher speed through a portion of the heating furnace and the second glass sheet G2 may be fed at the lower speed over the entire length of the heating furnace.

Figure 5:
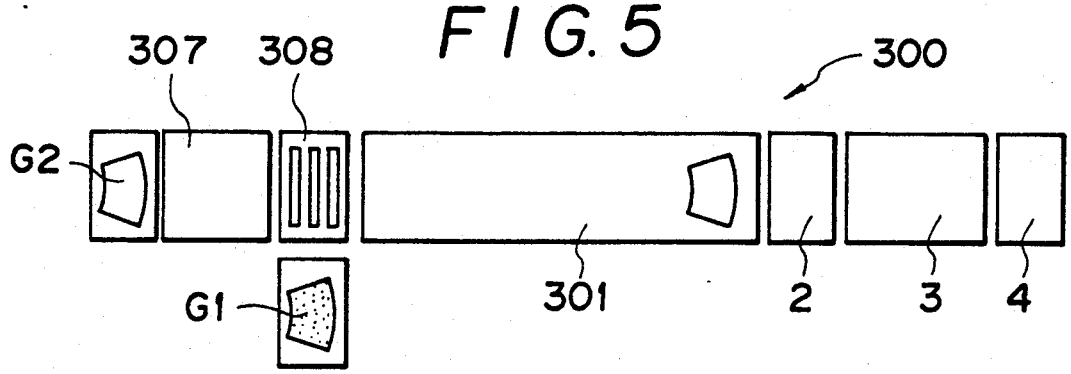
FIG. 5 is a schematic plan view of a sheet glass bending apparatus which carries out a method of heating glass sheets for laminated glass according to a third embodiment of the present invention.
Figure 6:
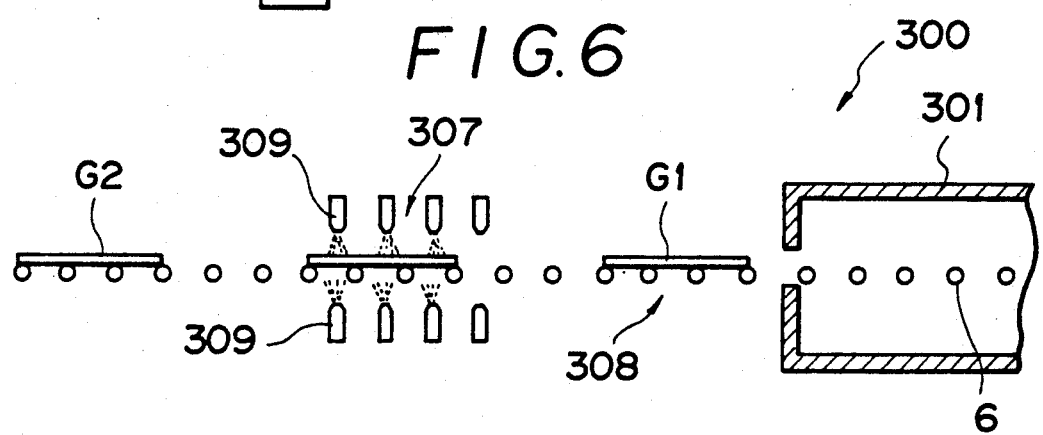
FIG. 6 is a fragmentary longitudinal cross-sectional view of an upstream portion of the sheet glass bending apparatus shown in FIG. 5.

FIGS. 5 and 6 show a sheet glass bending apparatus, generally designated by the reference numeral 300, which carries out a method of heating glass sheets for laminated glass according to a third embodiment of the present invention. Those components shown in FIGS. 5 and 6 which are identical to those shown in FIG. 1 are denoted by the identical reference numerals, and will not be described in detail.

Figure 7:
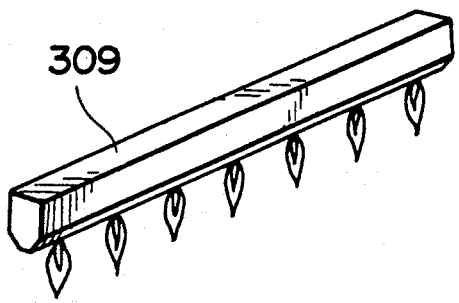
FIGS. 7 and 8 are perspective views of heaters for use in a preheating zone in the sheet glass bending apparatus shown in FIG. 5.
Figure 8:
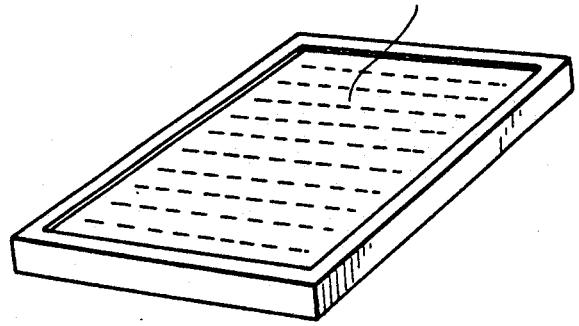

The sheet glass bending apparatus 300 comprises a heating furnace 301 which is heated to a constant temperature Ti therein, a preheating zone 307 positioned upstream of the heating furnace 301, an intermediate zone 308 disposed between the heating furnace 301 and the preheating zone 307, and a press machine 2, a lehr 3, and a pickup device 4 which are successively disposed downstream of the heating furnace 301. The second rollers 6 are disposed in the preheating zone 307, the intermediate zone 308, and the heating furnace 301, the second rollers 6 being arrayed over the entire length of the heating furnace 301. The preheating zone 307 has line burners 309 (see FIG. 7) disposed above and below a glass sheet feed path, for heating the upper and lower surfaces of second glass sheets G2. The preheating zone 307 may have a panel heater 310 (see FIG. 8) instead of the line burners 309. The intermediate zone 308 may be part of the heating furnace 301.

A first glass sheet G1 is introduced through the intermediate zone 308 into the heating furnace 301.

A second glass sheet G2 is first introduced into the preheating zone 307 in which the upper and lower surfaces of the second glass sheet G2 are uniformly heated by the burners 309 until the glass sheet G2 reaches a predetermined temperature in its entirety. The intensities of heat applied to the upper and lower surfaces of the glass sheet G2 are thus so equalized that the glass sheet G2 is prevented from warping when it is preheated. Thereafter, the second glass sheet G2 is introduced into the heating furnace 301.

After the first and second glass sheets G1, G2 have been introduced into the heating furnace 301, they are fed over the entire length of the heating furnace 301 at the lower speed Vl by the second rollers 6. The second glass sheet G2 is introduced into the heating furnace 301, following the first glass sheet G1. Therefore, the glass sheets G1, G2 are introduced into the heating furnace 301 in the sequence, and combined together in the pattern, shown in FIG. 3A. Of course, the first and second glass sheets G1, G2 may be introduced in the sequences, and combined in the patterns, shown in FIGS. 3B and 3C.

When the glass sheets G1, G2 are thus heated, the temperature To1 of the first glass sheet G1 at the exit of the heating furnace and the temperature To2 of the second glass sheet G2 at the heating furnace exit are equalized to each other. More specifically, in the sheet glass bending apparatus 300, the distances over, and the average speeds at, which the first and second glass sheets G1, G2 are fed in the heating furnace 301, are equal to each other. However, the temperatures To1, To2 are equalized to each other since the second glass sheet G2 is preheated before it is introduced into the heating furnace 301.

The degree to which the second glass sheet G2 is preheated in the preheating zone 307 is determined depending on the temperature Ti in the heating furnace Ti and desired temperatures To1, To2 of the glass sheets G1, G2 at the exit of the heating furnace 301.

FIGS. 9, 10, 11, 12 schematically show sheet glass bending apparatus, generally designated by the reference numerals 400, 500, 600, 700, respectively, which carries out methods of heating glass sheets for laminated glass according to fourth, fifth, sixth, and seventh embodiments of the present invention.

In each of the sheet glass bending apparatus 400, 500, 600, 700, the second rollers 6 are disposed in and arrayed over the entire length of the heating furnace.

Therefore, the first and second glass sheets G1, G2 are fed over the same distance at the same average speed in the heating furnace. However, the intensity of heat radiated to the first glass sheet G1 in the heating furnace is made lower than the intensity of heat radiated to the second glass sheet G2 in the heating furnace in the manner described below. As a result, in each of the sheet glass bending apparatus 400, 500, 600, 700, the temperature To1 of the first glass sheet G1 at the exit of the heating furnace and the temperature To2 of the second glass sheet G2 at the heating furnace exit are equalized to each other.

Figure 9:
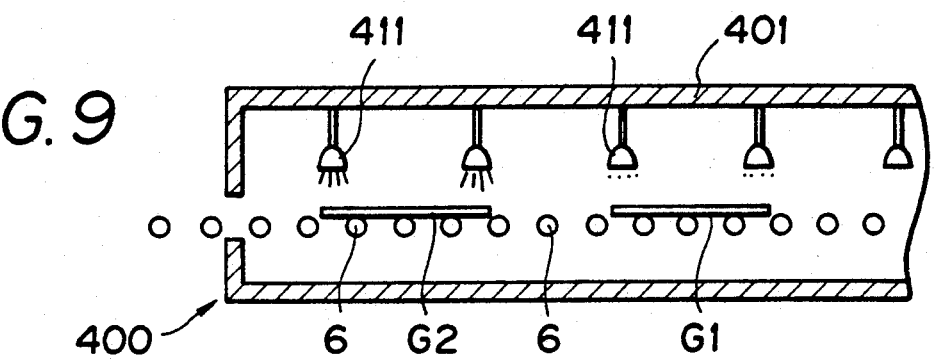
FIG. 9 is a fragmentary longitudinal cross-sectional view of a sheet glass bending apparatus which carries out a method of heating glass sheets for laminated glass according to a fourth embodiment of the present invention.

In the sheet glass bending apparatus 400 shown in FIG. 9, a series of gas burners 411 which can adjust the pressure of a supplied gas are disposed in a heating furnace 401. The pressure of a gas supplied to each of the gas burners 411 is adjusted to a certain level such that the gas burners 411 radiate a certain intensity of heat.

First, a first glass sheet G1 is introduced into the heating furnace 401, and fed by the rollers 6. While the glass sheet G1 is being fed in the heating furnace 401, the pressure of a gas supplied to the gas burners 411 is lowered by a control mechanism (not shown) thereby to reduce the quantity of heat radiated to the glass sheet G1. After passage of the glass sheet G1, the lowered gas pressure is increased again. Therefore, as the glass sheet G1 is progressively fed through the heating furnace 401, the gas pressures of the gas burners 401 are successively lowered and increased again. Following the first glass sheet G1, a second glass sheet G2 is introduced into and fed through the heating furnace 401 in which it is heated.

Figure 10:
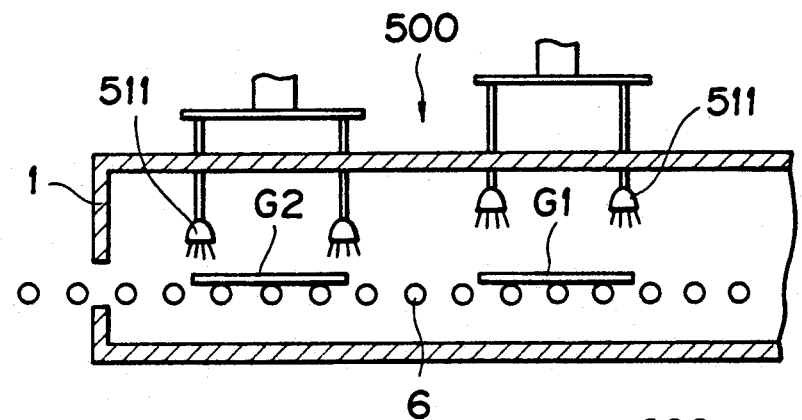
FIG. 10 is a fragmentary longitudinal cross-sectional view of a sheet glass bending apparatus which carries out a method of heating glass sheets for laminated glass according to a fifth embodiment of the present invention.

In the sheet glass bending apparatus 500 shown in FIG. 10, a series of gas burners 511 which are vertically movable between lifted and lowered positions are disposed in a heating furnace 501. The gas burners 511 are usually held in the lowered position.

First, a first glass sheet G1 is introduced into the heating furnace 501, and fed by the rollers 6. While the glass sheet G1 is being fed in the heating furnace 501, the gas burners 511 are elevated to the lifted position by a control mechanism (not shown) thereby to reduce the intensity of heat radiated to the glass sheet G1. After passage of the glass sheet G1, the elevated gas burners 511 are lowered to the lowered position. Therefore, as the glass sheet G1 is progressively fed through the heating furnace 501, the gas burners 501 are successively elevated and lowered again. Following the first glass sheet G1, a second glass sheet G2 is introduced into and fed through the heating furnace 501 in which it is heated.

Figure 11:
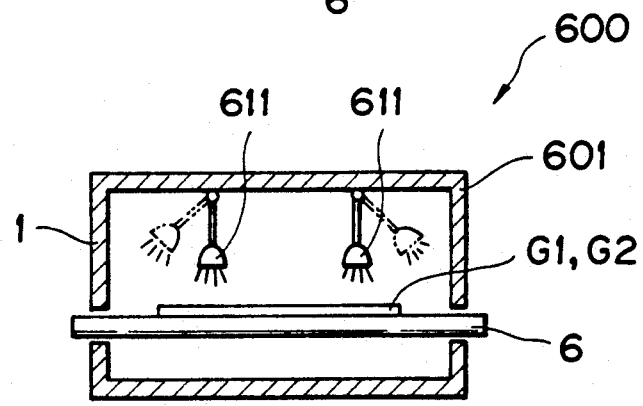
FIG. 11 is a transverse cross-sectional view of a sheet glass bending apparatus which carries out a method of heating glass sheets for laminated glass according to a sixth embodiment of the present invention.

In the sheet glass bending apparatus 600 shown in FIG. 11, a series of gas burners 611 which are swingable laterally across the glass sheet feed path are disposed in a heating furnace 601. The gas burners 611 are usually directed downwardly.

First, a first glass sheet G1 is introduced into the heating furnace 601, and fed by the rollers 6. While the glass sheet G1 is being fed in the heating furnace 601, the gas burners 611 are swung laterally by a control mechanism (not shown) thereby to reduce the intensity of heat radiated to the glass sheet G1. After passage of the glass sheet G1, the gas burners 611 are returned to the downwardly oriented position. Therefore, as the glass sheet G1 is progressively fed through the heating furnace 601, the gas burners 601 are successively swung laterally and returned to the downwardly oriented position again. Following the first glass sheet G1, a second glass sheet G2 is introduced into and fed through the heating furnace 601 in which it is heated.

Figure 12:
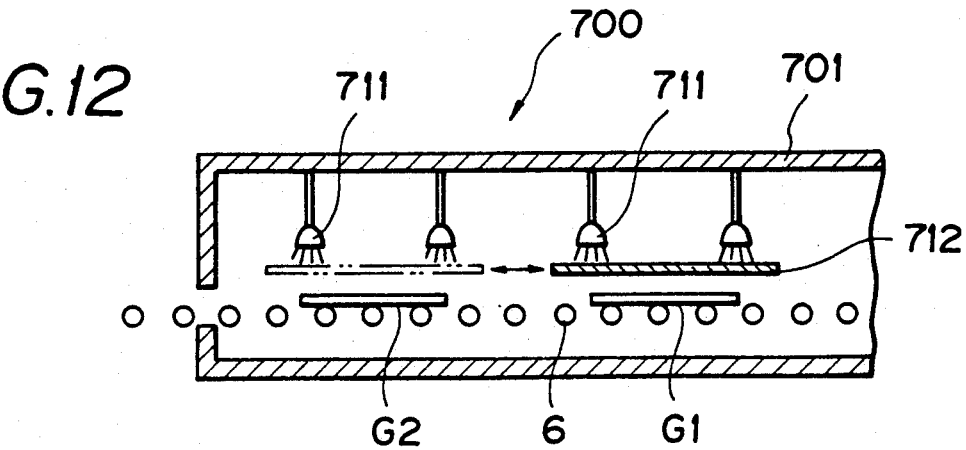
FIG. 12 is a fragmentary longitudinal cross-sectional view of a sheet glass bending apparatus which carries out a method of heating glass sheets for laminated glass according to a seventh embodiment of the present invention.

In the sheet glass bending apparatus 700 shown in FIG. 12, a series of gas burners 711 are disposed in a heating furnace 701. The heating furnace 701 houses a horizontal shield plate 712 disposed between the burners 711 and the rollers 6, the shield plate 712 being horizontally movable reciprocally along the glass sheet feed path in the heating furnace 701.

First, a first glass sheet G1 is introduced into the heating furnace 701, and fed by the rollers 6. While the glass sheet G1 is being fed in the heating furnace 701, the shield plate 712 is moved with the glass sheet G1 over a predetermined distance by a control mechanism (not shown) such that the shield plate 712 is positioned upwardly of the glass sheet G1. A second glass sheet G2 is introduced into the heating surface 701, following the first glass sheet G1, and is heated while being fed in the heating furnace 701.

While the gas burners are illustrated in the above embodiments shown in shown in FIGS. 9 through 12, other heating means such as electric heating wires or hot air may be used in place of the gas burners.

With the heating methods according to the present invention, as described above, the temperatures To1, To2, at the exit of the heating furnace, of first and second glass sheets G1, G2 which are to be combined into a laminated glass sheet and which have different characteristics are equalized to each other. Therefore, the glass sheets G1, G2 can be pressed or otherwise processed into a desired shape. As a consequence, the glass sheets G1, G2 can well be bonded to each other after they have been shaped and annealed.

In the illustrated embodiments, it is necessary that the temperatures To1, To2 of the first and second glass sheets G1, G2 at the exit of the heating furnace be equal to each other. However, this requirement may not be satisfied if the glass sheets G1, G2 should be heated to different temperatures To1, To2 at the exit of the heating furnace depending on the condition in which the glass sheets G1, G2 will subsequently be bent to shape.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A method of heating a first glass sheet and a second glass sheet which are to be combined into a single laminated glass sheet, in at least a constant temperature heating furnace before the first and second glass sheets are shaped, the first glass sheet being heatable more easily than the second glass sheet, said method comprising the step of:

continuously feeding the first and second glass sheets over the same distance in the heating furnace while keeping the first and second glass sheets horizontal; and heating the first and second glass sheets in the constant temperature furnace so that the temperature of the first glass sheet at the exit of the heating furnace and the temperature of the second glass sheet at the exit of the heating furnace are substantially equal to each other, said heating step including the step of heating the first and second glass sheets while the first glass sheet is continuously being fed over said distance at an average speed which is higher than the average speed at which the second glass sheet is fed in the heating furnace.

2. A method of heating a first glass sheet and a second glass sheet which are to be joined into a laminated glass sheet, in a heating furnace, one of the first and second glass sheets being heatable more easily than the other, said method comprising the step of:
   feeding at least said one of the first and second glass sheets in the heating furnace selectively at a constant speed and a higher speed; and
   feeding said one glass sheet over a longer distance at the higher speed in the heating furnace, than a distance over which the other glass sheet is fed at the higher speed in the heating furnace.

3. A method of heating, in a heating furnace, a first glass sheet and a second glass sheet which are to be paired together to form a laminated glass sheet, one of the first and second glass sheets being heatable more easily than the other, said method comprising the steps of:
   maintaining the temperature of the furnace constant;
   feeding said glass sheets in horizontal position serially along a first section of the furnace, in which section the speed is adjustable to a first constant speed or a second, higher constant speed;
   varying the distance in the first section along which said one glass sheet is moved at the second speed so that said one glass sheet is in the first section for a shorter time than the other glass sheet; and
   feeding said glass sheets in horizontal position serially along a second section of the furnace to the exit thereof at the first constant speed, such that the glass sheets to be paired move the same total distance in the furnace but have different average speeds in the furnace.

* * * * *